April 21, 1970 W. H. STAPLETON 3,507,254
ANIMAL FEEDER
Filed Sept. 23, 1968 2 Sheets-Sheet 1

April 21, 1970   W. H. STAPLETON   3,507,254
ANIMAL FEEDER
Filed Sept. 23, 1968   2 Sheets-Sheet 2
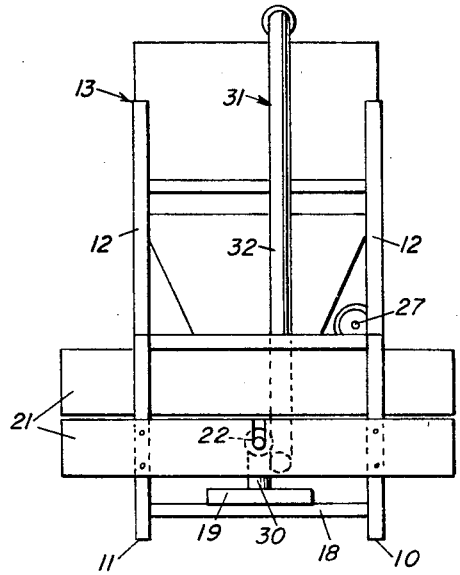
FIG.3
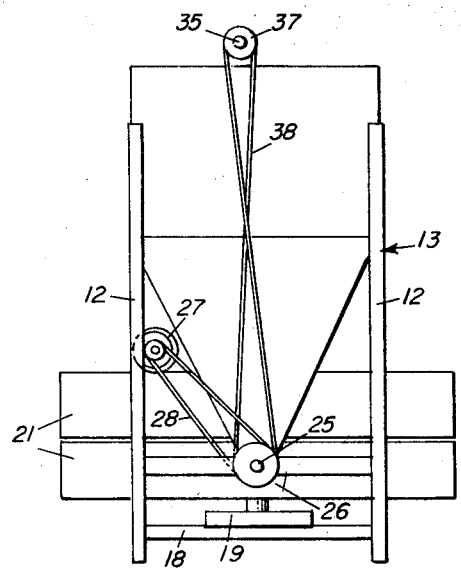
FIG.4
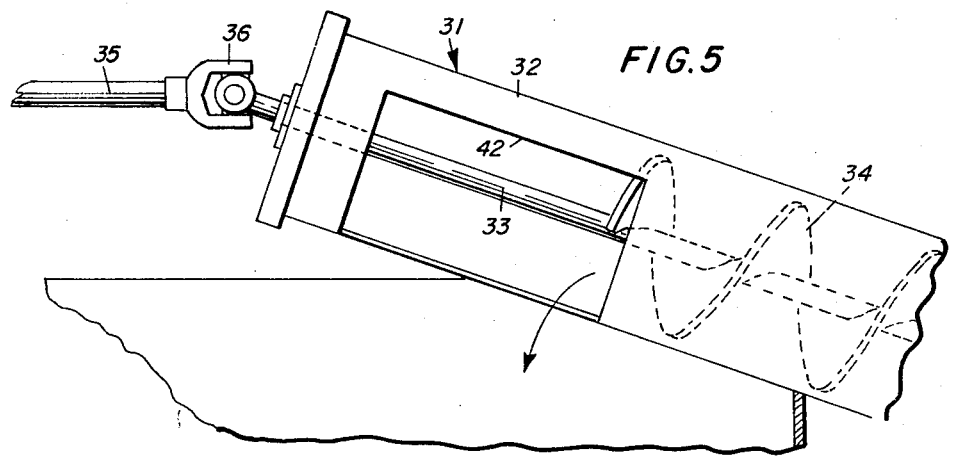
FIG.5
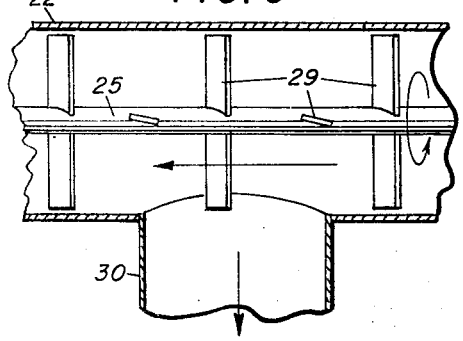
FIG.6
FIG.7
INVENTOR
WILLARD H. STAPLETON
BY Christen, Sabel & O'Brien
ATTORNEYS

United States Patent Office 3,507,254
Patented Apr. 21, 1970

3,507,254
ANIMAL FEEDER
Willard H. Stapleton, R.F.D. 1, Lumber City, Ga. 31549
Filed Sept. 23, 1968, Ser. No. 761,457
Int. Cl. *A01k 5/00*
U.S. Cl. 119—52      8 Claims

ABSTRACT OF THE DISCLOSURE

Animal feeder especially adapted for sows having a row of feeding stations above a trough, with a conveyor system for continuously replenishing a controlled amount of feed at each station from a supply hopper and for returning any excess feed to the hopper.

---

An object of the invention is to provide a portable animal feeder having a series of feeding stations mounted on a framework which can be moved from one location to another with little difficulty and having power driven means for maintaining a supply of feed at each of the stations regardless of the rate at which fed is consumed at each station.

Another object of the invention is to provide an automatically controlled feeding mechanism having a plurality of feeding stations, wherein the feed is protected from contamination at all times until it is delivered to the respective stations, and wherein any excess supply may be returned to the supply hopper.

Other objects and advantages will be apparent to those skilled in the art after reading the following specification in connection with the annexed drawings.

Figure 1:
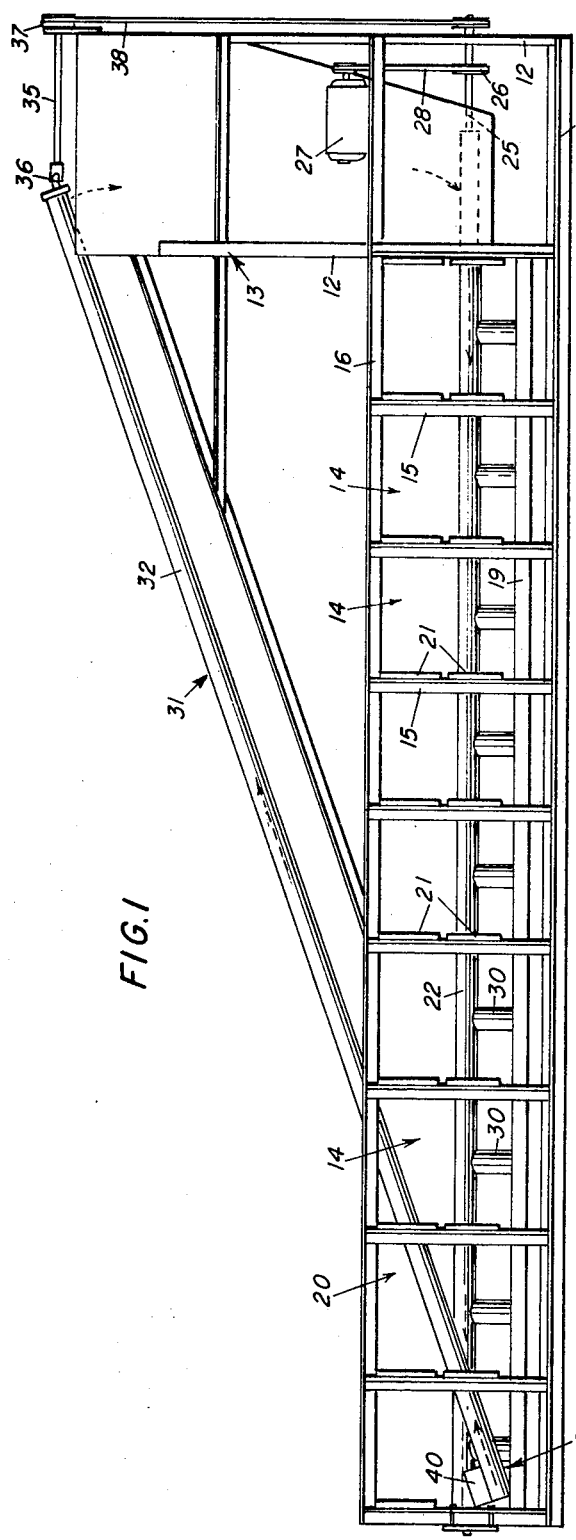
Figure 2:
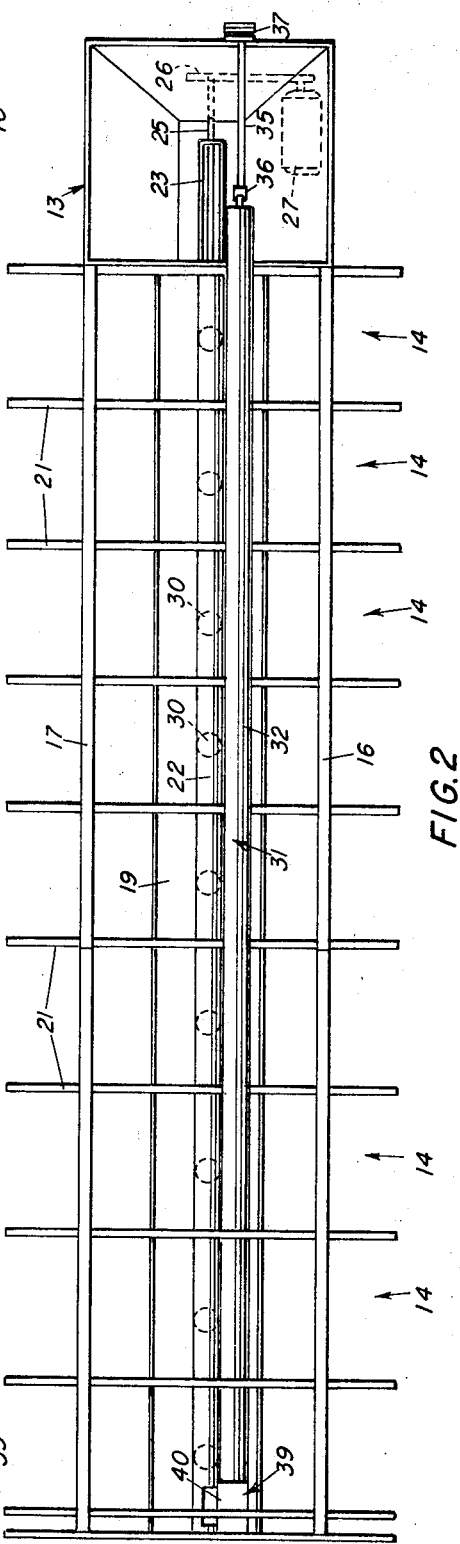

In the drawings, FIG. 1 is a view in elevation of a preferred embodiment of the invention in accordance with the present disclose; FIG. 2 is a plan view of the apparatus shown in FIG. 1; FIG. 3 is an end elevation of the invention as viewed from the left in FIG. 1; FIG. 4 is an end elevation as viewed from the right in FIG. 1; FIG. 5 is a fragmentary view in elevation, on an enlarged scale, of the discharge end of the return conveyor; FIG. 6 is a fragmentary view of a vertical cross-section, on an enlarged scale, of one of the discharge stations for the supply conveyor, and FIG. 7 is a fragmentary view in elevation, on a somewhat larger scale, of the transfer station.

The apparatus shown in the drawings comprises a pair of horizontal supporting members 10 and 11 to provide a base for the vertical uprights 12 supporting a hopper means, indicated generally by numeral 13, into which the animal feed is placed for distribution to the various feeding stations, indicated generally by numeral 14. These stations are defined by a series of vertical upright supports 15, attached at their lower ends to the two base supports 10 and 11 and connected together at their upper ends by means of elongated horizontal bracing members 16 and 17. In addition, a series of transverse horizontal supports 18 are provided which extend between pairs of upright 15 so as to support a long horizontal trough 19 at a suitable distance above the ground. The feed from the bottom of the hopper is deposited by means of a horizontally extending conveying system, indicated generally by numeral 20. In order to prevent interference between animals the stalls, or stations, 14 may also be separated by transversely extending vertical panel members 21 attached to the uprights 15.

The conveyor means 20 comprises essentially a long tubular conduit 22 having its intake and 23 opening into the interior of the hopper 13 with its discharge end 24 supported at the endmost one of the panels 21. Within the conduit there is a concentrically mounted rotatable shaft 25 is provided within the conduit with a series of axially spaced radially extending impeller blades 29, the surfaces of these blades being angled in accordance with understood principles to urge materials from the hopper through the length of the conduit towards the discharge end of the conveyor system. In addition, at each of the feeding stations the conduit 22 is provided with a suitable downwardly directed opening to each of which is attached a dispensing tube 30, the lower open end of each of these tubes terminating a short distance above the surface of the trough 19. The size of the impeller blades and their spacing as well as the rate of rotation of the shaft is arranged so that a sufficient amount of feed will be moved through the conduit to keep each of the dispensing tubes 30 filled. At the same time, it will be realized that because the impellers do not constitute a continuous helical surface (as in the case of conventional screw-type conveyors), the conveyor system will not force feed down into the feeding stations in excess of the requirement at each station since the conveyor means is not of the positive feed type. However, the delivery conveyor system 20 is preferably operated at a speed to insure a slight excess of feed at the far end of the conveyor in order to ensure that all of these feed stations are continuously supplied.

Furthermore, in order to dispose of the excess of feed supplied at the discharge end of the main conveyor, a return conveyor system, indicated generally by numeral 31, is provided to carry the excess of feed back to the hopper 13. This latter conveyor system comprises a tubular conduit 32 having a concentrically mounted rotatable shaft 33 contained therein provided with a continuous helical radially extending surface 34. At its upper end this shaft 33 is connected to a driving shaft 35 by means of a universal joint 36, the shaft 35 having a pulley 37 attached thereto for driving connection with the shaft 25 through the belt 38. The intake end 39 of the return conduit 32 is open at the top and provided with a deflecting shield 40 which guides the excess of feed discharged from an opening 41 in the main conveyor mechanism 20; this excess being carried upwardly by the rotating screw conveyor mechanism where it is discharged from an opening 42 at the upper end of the return conveyor 31 back into the hopper 13.

In operation, feed placed in the hopper is carried along to the various feeding stations, where it falls down through the tubes 30 into the trough 19, building up into separate piles under each tube until it reaches the lower extremity thereof. As the feed is consumed it is automatically replaced by gravity so long as there is available feed in the hopper and the conveyor system is operating. Furthermore, it will be understood by those familiar with the feeding of sows, especially those carrying unborn pigs, that it is essential, although extremely difficult, to regulate the amount of feed given at any one period. Therefore, the present invention makes it possible to control the amount of feed delivered to each of the stations, and the presence of the panels 21, which confines each animal to a single station, ensures that the individual animals will receive only the regulated amount intended, with an excess being returned to the hopper by the return conveyor.

Having disclosed a preferred form of the invention, it will be obvious to those skilled in the art that various modifications and improvements may be made.

I claim:
1. Animal stock feeding apparatus comprising, hopper means for containing a supply of pulverulent feed material, primary elongated horizontal tubular supply conduit means having one end in communication with the lower interior of said hopper means, a plurality of de- pending secondary tubular supply conduit means having their respective upper ends in communication with the interior of said primary supply conduit means at spaced feed locations along the length thereof, feed trough means including a substantially horizontal surface below the lower open end of each of said secondary supply conduit means and having side walls cooperating therewith to automatically limit the available supply of feed at each of said feed locations, and impeller means extending the length of the interior of the primary conduit means for moving feed from the hopper means through the primary supply conduit means for discharge at said feed location, said impeller means having discontinuous surfaces whereby an accumulation of feed at one location will not prevent moving of feed to another location, and enclosed conveyor means for returning excess feed in said primary supply conduit means to the upper interior of said hopper means.

2. The invention defined in claim 1 wherein said conveyor means for returning excess feed comprises a continuous screw element.

3. The invention defined in claim 1 wherein said conveyor means for returning excess feed includes tertiary conduit means having a discharge end in communication with the interior of the hopper means and an intake portion disposed to receive feed discharged by the primary supply conduit means at a location remote from the hopper means.

4. The invention defined in claim 1 wherein said trough means comprises an elongated channel-shaped element disposed below a plurality of said secondary supply conduits.

5. The invention defined in claim 4 wherein said apparatus includes framework means for supporting said primary supply conduit means in association with said hopper means, said framework means including a plurality of transverse partitions placed between adjacent ones of said secondary supply conduit means to provide a plurality of feeding stalls.

6. The invention defined in claim 1, wherein said impeller means for moving feed in the primary supply conduit means includes a rotatably mounted shaft extending along the interior of the conduit means, and a plurality of spaced vanes extending radially outwardly from said shaft.

7. The invention defined in claim 3, wherein said tertiary conduit means is inclined, and said conveyor means is of the positive displacement type whereby feed in said tertiary conduit means will not move in a reverse direction to back up on feed in said primary conduit means.

8. The invention defined in claim 7, wherein said positive displacement conveyor means includes a continuous screw conveyor.

References Cited
UNITED STATES PATENTS

| | | | |
|---|---|---|---|
| 2,571,637 | 10/1951 | Weist | 198—64 |
| 2,970,568 | 2/1961 | Johnson | 119—52 |
| 3,033,163 | 5/1962 | Hostetler et al. | 119—52 |
| 3,074,534 | 1/1963 | Thiele | 198—66 |
| 3,075,495 | 1/1963 | Stoterau et al. | 119—18 X |
| 3,134,478 | 5/1964 | Haeh et al. | 119—52 X |

HUGH R. CHAMBLEE, Primary Examiner